(12) United States Patent
Gomi (10) Patent No.: US 10,602,677 B2
(45) Date of Patent: Mar. 31, 2020

(54) PLANT GROWTH APPARATUS

(71) Applicant: Koito Manufacturing Co., Ltd., Tokyo (JP)

(72) Inventor: Masato Gomi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 220 days.

(21) Appl. No.: 15/643,579

(22) Filed: Jul. 7, 2017

(65) Prior Publication Data

US 2018/0014475 A1  Jan. 18, 2018

(30) Foreign Application Priority Data

Jul. 14, 2016 (JP) .................. 2016-139076

(51) Int. Cl.
*A01G 9/24* (2006.01)
*A01G 31/02* (2006.01)
*G02B 6/32* (2006.01)
*G02B 6/44* (2006.01)
*A01G 7/04* (2006.01)
*A01G 9/18* (2006.01)
(Continued)

(52) U.S. Cl.
CPC ............ *A01G 9/246* (2013.01); *A01G 7/045* (2013.01); *A01G 9/18* (2013.01); *G02B 6/0006* (2013.01); *G02B 6/0008* (2013.01); *G02B 6/32* (2013.01); *G02B 6/4472* (2013.01); *Y02A 40/268* (2018.01); *Y02P 60/216* (2015.11)

(58) Field of Classification Search
CPC .......... A01G 9/024; A01G 9/246; A01G 9/18; A01G 9/20; A01G 9/249; A01G 9/24; A01G 9/26; A01G 31/02; A01G 7/045; G02B 6/32; G02B 6/4472; G02B 6/0006; G02B 6/0008; G02B 6/4204; Y02A 40/268; Y02P 60/216

See application file for complete search history.

(56) References Cited

U.S. PATENT DOCUMENTS

| | | | | |
|---|---|---|---|---|
| 4,662,106 A | * | 5/1987 | Mori ...................... | A01G 7/045 47/17 |
| 8,468,741 B2 | * | 6/2013 | Lewis .................... | A01G 31/06 47/66.6 |

(Continued)

FOREIGN PATENT DOCUMENTS

| | | |
|---|---|---|
| JP | 2014-161298 A | 9/2014 |
| JP | 2015-171351 A | 10/2015 |

(Continued)

*Primary Examiner* — Joshua D Huson
(74) *Attorney, Agent, or Firm* — Abelman, Frayne & Schwab (57) ABSTRACT

Provided is a plant growth apparatus including: an apparatus main body having a growth space configured to grow a plant therein; an illumination device configured to irradiate light to the plant; and air conditioning device configured to control the internal air of the growth space. The illumination device includes a plurality of light source units provided separately from the apparatus main body. The air conditioning device includes a plurality of air conditioners provided separately from the apparatus main body. One of the plurality of light source units and/or one of the plurality of air conditioners is/are selected and connected to the apparatus main body.

10 Claims, 5 Drawing Sheets

(51) Int. Cl.
*A01G 9/20* (2006.01)
*F21V 8/00* (2006.01)

(56) References Cited

U.S. PATENT DOCUMENTS

| | | | | |
|---|---|---|---|---|
| 9,591,815 B2* | 3/2017 | Fujiyama | A01G 9/00 |
| 9,974,243 B2* | 5/2018 | Martin | A01G 31/047 |
| 10,342,191 B2* | 7/2019 | Scanlon | A01G 9/20 |
| 2011/0192082 A1* | 8/2011 | Uchiyama | A01G 9/24 | 47/66.6 |
| 2011/0287705 A1* | 11/2011 | Kamp | A01G 9/246 | 454/239 |
| 2012/0054061 A1* | 3/2012 | Fok | A01G 31/00 | 705/26.5 |
| 2012/0111954 A1* | 5/2012 | Kim | A01G 9/24 | 236/49.1 |
| 2012/0210640 A1* | 8/2012 | Ivanovic | A01G 9/24 | 47/58.1 LS |
| 2013/0145688 A1* | 6/2013 | Tatsumi | A01G 7/00 | 47/60 |
| 2013/0255146 A1* | 10/2013 | Lehman | A01G 31/00 | 47/17 |
| 2014/0115958 A1* | 5/2014 | Helene | A01G 9/14 | 47/17 |
| 2014/0137468 A1* | 5/2014 | Ching | A01G 9/16 | 47/17 |
| 2014/0311025 A1* | 10/2014 | Pauls | A01G 9/24 | 47/17 |
| 2014/0318012 A1* | 10/2014 | Fujiyama | F24F 11/0001 | 47/62 R |
| 2014/0344099 A1* | 11/2014 | Fok | A01G 31/00 | 705/26.5 |
| 2014/0344100 A1* | 11/2014 | Fok | A01G 31/00 | 705/26.5 |
| 2015/0027048 A1* | 1/2015 | Fok | A01G 31/00 | 47/66.7 |
| 2015/0027356 A1* | 1/2015 | Fok | A01G 31/00 | 111/100 |
| 2016/0157439 A1* | 6/2016 | Greene | A01G 9/14 | 47/17 |
| 2016/0316646 A1* | 11/2016 | Lepp | A01G 7/045 |
| 2017/0254517 A1* | 9/2017 | Nijkamp | A01G 9/26 |
| 2018/0288950 A1* | 10/2018 | Ogata | A01G 9/16 |

FOREIGN PATENT DOCUMENTS

| | | | |
|---|---|---|---|
| JP | 2016-507220 A | 3/2016 | |
| WO | WO-2016037950 A1 * | 3/2016 | A01G 9/26 |

* cited by examiner

PLANT GROWTH APPARATUS

CROSS-REFERENCE TO RELATED APPLICATIONS

This application is based on and claims priority from Japanese Patent Application No. 2016-139076, filed on Jul. 14, 2016 with the Japan Patent Office, the disclosure of which is incorporated herein in its entirety by reference.

TECHNICAL FIELD

The present disclosure relates to a plant growth apparatus capable of artificially controlling a plant growing environment, and more particularly to a plant growth apparatus which is suitable for application to a test apparatus for verifying a growing effect and a plant physiological phenomenon by changing and controlling the growing environment.

BACKGROUND

As one of such a type of plant growth apparatuses, there has been proposed a plant growth apparatus that includes a closed type growth space configured to grow plants and is provided with an air conditioning device that controls the environments such as temperature and humidity within the growth space, and an illumination device that controls the lighting within the growth space. For example, Japanese National Publication of International Publication No. 2016-507220 suggests a technique for controlling illuminance in an artificial light source as an illumination device. Japanese Patent Laid-Open Publication No. 2015-171351 proposes a technique for controlling the temperature of the growth space using an air conditioning device. Japanese Patent Laid-Open Publication No. 2014-161298 proposes a technique for controlling temperature by controlling ventilation of a growth space using an air conditioning device.

Techniques disclosed in Japanese National Publication of International Patent Application No. 2016-507220, Japanese Patent Laid-Open Publication No. 2015-171351, and Japanese Patent Laid-Open Publication No. 2014-161298 are effective as general or general-purpose plant growth apparatuses that are not limited to plant species to be grown, but are not necessarily the most suitable apparatuses for growing different plant species. That is, in different plant species, it is considered that the respective optimal growing conditions, particularly, the environmental conditions such as temperature and humidity in the growth space, and the illumination conditions such as illuminance and light color (light spectrum) of the artificial light source are different from each other.

Therefore, test apparatuses for finding the optimal growing conditions for each of different plant species are considered. For example, the optimal growing conditions for each plant species can be obtained by configuring a test apparatus capable of observing the growing state of plants by changing and controlling the various growing conditions disclosed in Japanese National Publication of International Patent Application No. 2016-507220, Japanese Patent Laid-Open Publication No. 2015-171351, and Japanese Patent Laid-Open Publication No. 2014-161298. However, since the techniques disclosed in Japanese National Publication of International Patent Application No. 2016-507220, Japanese Patent Laid-Open Publication No. 2015-171351, and Japanese Patent Laid-Open Publication No. 2014-161298 are configurations in which illumination devices are fixedly provided inside the growth space, the change and control of the illumination conditions are restricted. In particular, it is very difficult to change and control the optical spectrum under the same light source. In order to realize the change and control, it is necessary to replace the entire light source or illumination device with one having different standards, and the work for doing this becomes complicated.

Further, the techniques disclosed in Japanese National Publication of International Patent Application No. 2016-507220 and Japanese Patent Laid-Open Publication No. 2015-171351 have a limitation in terms of the controlled speed at the time of changing the environmental conditions of the growth space since the air conditioning device is integrally provided with respect to the plant growth apparatus. Especially, since it is difficult to change and control the environmental conditions of the growth space instantaneously, a time lag occurs until a test for another plant species is started, and as a result, the test time is lengthened. In addition, when a large capacity air conditioner is used, it is possible to increase the controlled speed. However, the test apparatus provided with such an air conditioning device becomes large and expensive.

An object of the present disclosure is to provide a plant growth apparatus configured to expand the range of change and control of illumination conditions in a growth space with a simple operation. Another object of the present disclosure is to provide a plant growth apparatus configured to rapidly change and control the environmental conditions of the growth space.

SUMMARY

The present disclosure relates to a plant growth apparatus including: an apparatus main body having a growth space configured to grow a plant therein; an illumination device configured to irradiate light to the growth space; and an air conditioning device configured to control air inside the growth space. The plant growth apparatus includes a plurality of light source units provided separately from the apparatus main body and/or a plurality of air conditioners provided separately from the apparatus main body, and one of the plurality of light source units and/or one of the plurality of air conditioners is/are selected to be connectable to the apparatus main body.

A first aspect of the present disclosure is a plant growth apparatus including: an apparatus main body having a growth space configured to grow a plant therein; and an illumination device configured to irradiate light to the growth space. The illumination device includes: an illumination unit provided in the apparatus main body and configured to irradiate light toward the growth space; a plurality of light source units provided separately from the apparatus main body and configured to emit lights of different spectrum, respectively; and a light source selection unit configured to select light emitted from the light source units and guide the light to the illumination unit.

A second aspect of the present disclosure is a plant growth apparatus including: an apparatus main body having a growth space configured to grow a plant therein; and an air conditioning device configured to control air inside the growth space. The air conditioning device includes: a plurality of air conditioners provided separately from the apparatus main body and configured to adjust air under different environmental conditions, respectively; and an air conditioning switching unit configured to selectively connect the growth space and the plurality of air conditioners to each other.

According to the present disclosure, since the plurality of light source units are configured independently from the apparatus main body, the degree of freedom of design is high and the types, standards, and combinations of the light sources may be freely set. Therefore, it is possible to increase the range of changing and controlling the illumination conditions in the growth space by the light emitted from each of the light source units. Further, according to the present disclosure, since the plurality of air conditioners are independent components and the plurality of air conditioners are selectively connected to the apparatus main body, it is possible to change and control the environmental conditions of the growth space promptly by controlling a connected air conditioner in an idle state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 3A and 3B are views for describing a first light source unit, in which

FIGS. 4A and 4B are views for describing a second light source unit, in which

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
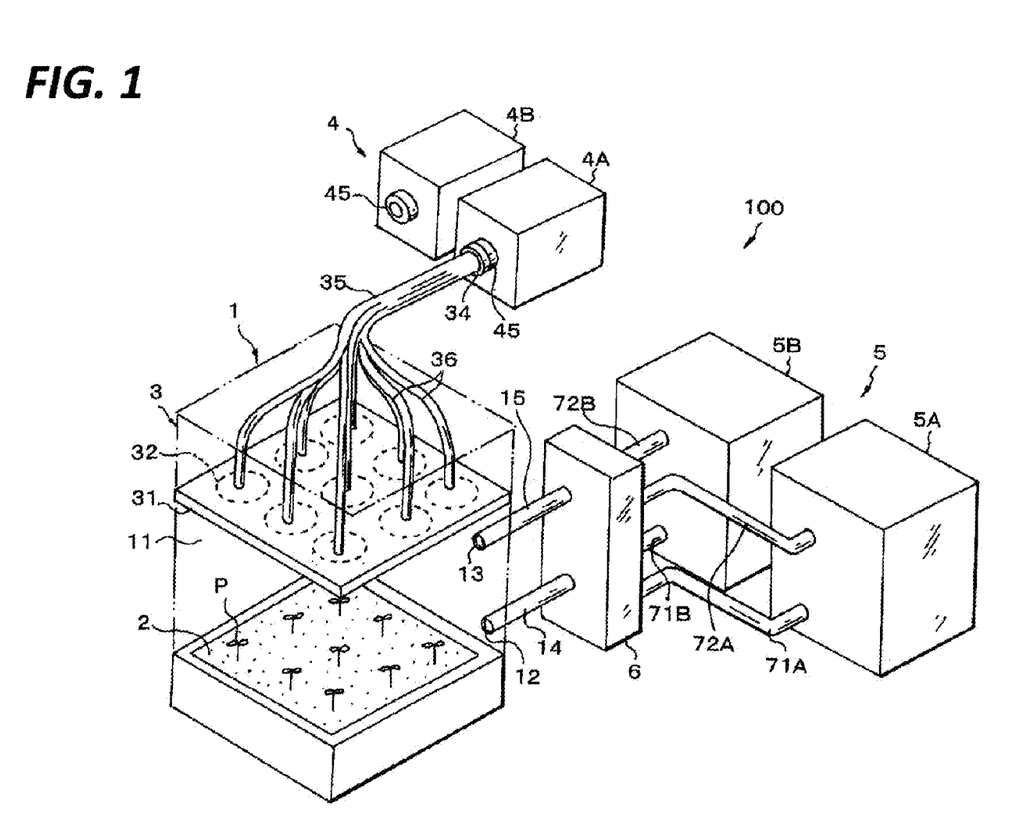
FIG. 1 is a schematic cross-sectional view illustrating a conceptual configuration of a plant growth apparatus according to an exemplary embodiment.

Hereinafter, exemplary embodiments of the present disclosure will be described with reference to the drawings. FIG. 1 is a view illustrating a conceptual configuration of a plant growth apparatus configured as a test apparatus for obtaining an optimal illumination condition and environmental condition when growing plants as test subjects. This plant growth apparatus (hereinafter referred to as a "test apparatus") 100 has a box-shaped apparatus main body 1 in which a closed-type growth space 11 is formed. A growth bed unit 2 is provided in a lower region of the growth space 11 of the apparatus main body 1 and an illumination unit 3 is provided in an upper region of the growth space 11.

For example, the growth bed unit 2 is configured to correspond to the growing form of plants P. In the case of a plant to be hydroponically grown, the growth bed unit 2 is configured as a hydroponic bed, or in the case of a plant for soil growth, the growth bed unit is configured as a soil bed. When the plants P are potted, the growth bed unit 2 is configured as a placing bed on which one or more pots are placed.

The illumination unit 3 is provided in order to irradiate the plants P grown in the growth bed unit 2 with artificial light. The illumination unit 3 is optically connected to a light source unit 4 provided separately from the apparatus main body 1 (details of the light source unit 4 will be described later). The illumination unit 3 is configured to irradiate the light emitted from the light source unit 4 to the plants P with a required light distribution, that is, a light intensity distribution or illuminance distribution. The illumination device of the present disclosure is constituted with the illumination unit 3 and the light source unit 4.

An air intake port 12 and an air exhaust port 13 are opened in the apparatus main body 1 in order to open the growth space 11 to the outside. An air intake pipe 14 and an air exhaust pipe 15 are connected to the air intake port 12 and the air exhaust port 13, respectively, and the air intake pipe 14 and the air exhaust pipe 15 are connected to an air conditioner 5 via an air conditioning switching device 6, as will be described later. The air conditioning device of the present disclosure is constituted with the air conditioning switching device 6 and the air conditioner 5.

Figure 2:
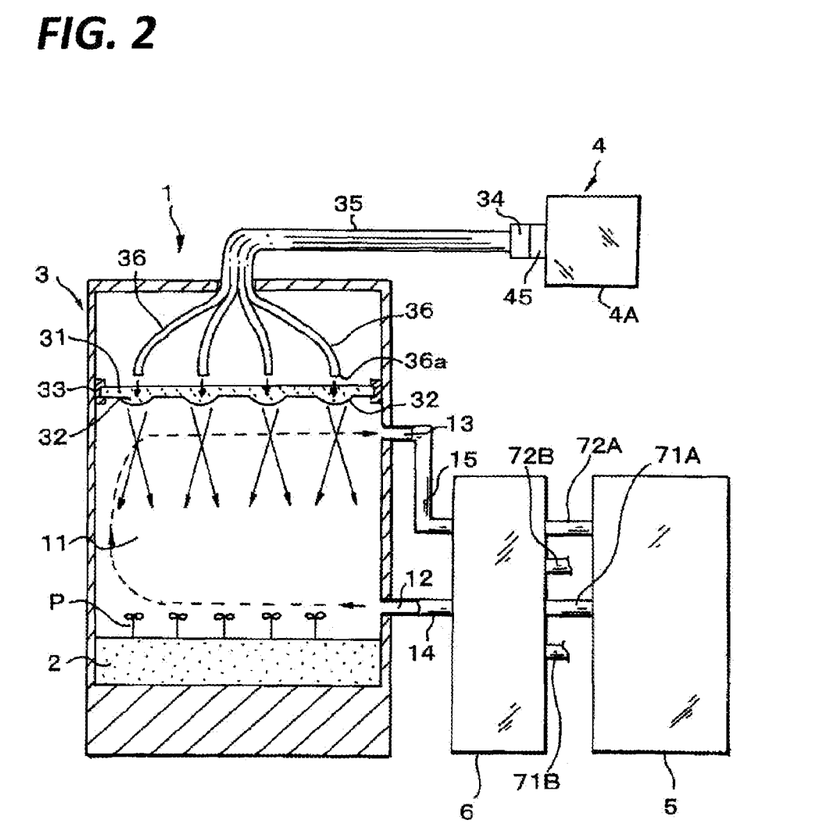
FIG. 2 is a view schematically illustrating a mode of changing and controlling illumination conditions and environmental conditions according to an exemplary embodiment.

FIG. 2 is a schematic structural view for describing the functions of the illumination device and the air conditioning device together. With reference to FIGS. 1 and 2, the light source unit 4 includes a plurality of light source units having respectively different standards (in this exemplary embodiment, two first light source units 4A and two second light source units 4B). The first and second light source units 4A and 4B are assembled in independent housings that are separate from the apparatus main body 1, and are configured to collect and emit the light emitted from the respective light sources. Although the first light source unit 4A and the second light source unit 4B are arranged at a position as close to the apparatus main body 1 as possible, the position may be properly set.

Figure 3A:
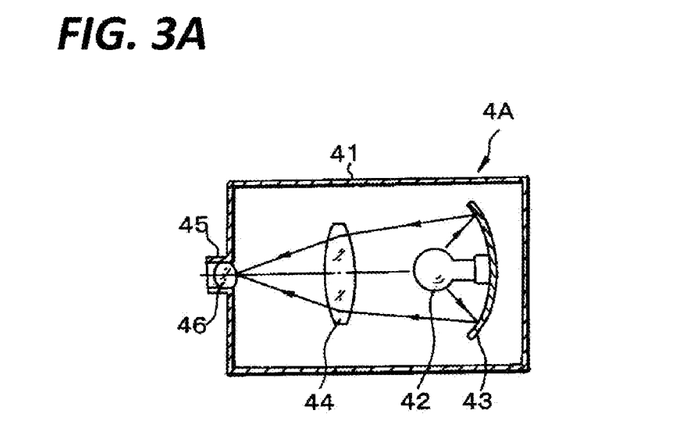
FIG. 3A is a schematic cross-sectional view.
Figure 3B:
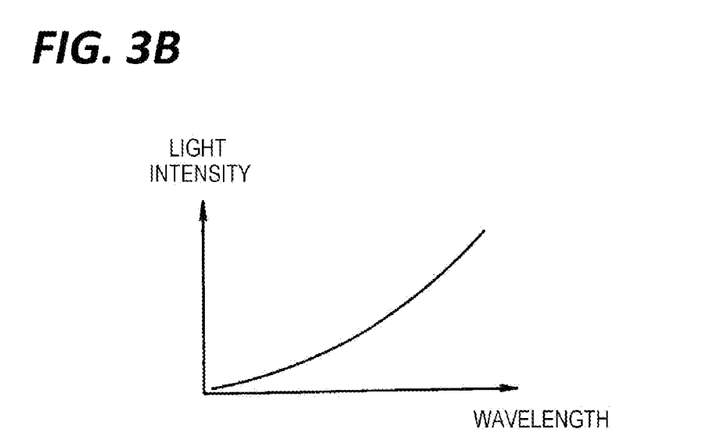
FIG. 3B is a spectrum diagram of emitted light.

As illustrated in FIG. 3A, the first light source unit 4A is provided with an incandescent lamp 42 in a casing 41 as a light source. As a spectral characteristic is illustrated in FIG. 3B, the incandescent lamp 42 emits a reddish light color, that is, a light with a spectrum of a long-wavelength side component. A condenser mirror 43 and a condenser lens 44 are provided in the casing 41. The light emitted by the incandescent lamp 42 is condensed by the condenser mirror 43 and further condensed by the condenser lens 44. Further, in the casing 41, a light transmitting connector 45 is provided at the light-condensing position of the condenser lens 44, and configured to be connected to a light receiving connector which will be described later. An optical coupling lens 46 is mounted inside the light transmitting connector 45. Further, although not illustrated, the first light source unit 4A is provided with a light intensity control unit for adjusting the light emission intensity of the incandescent lamp 42 to be capable of adjusting the light emission intensity by an operation from the outside.

Figure 4A:
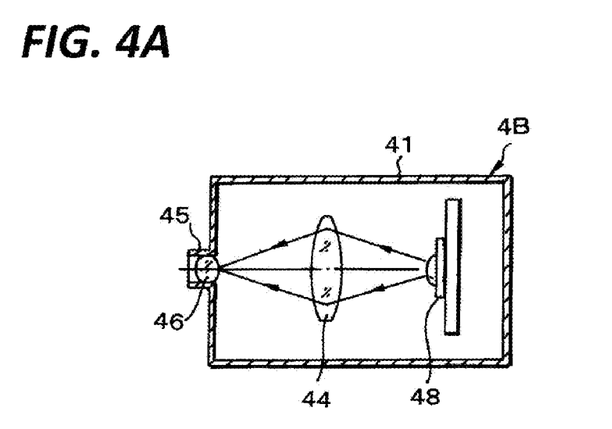
FIG. 4A is a schematic cross-sectional view.
Figure 4B:
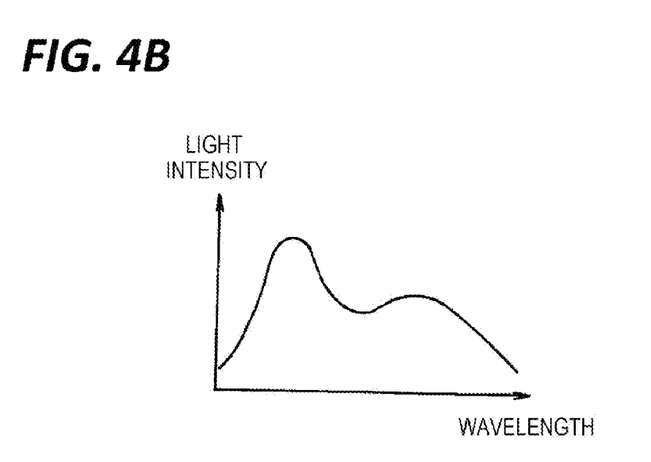
FIG. 4B is a spectrum diagram of emitted light.

As illustrated in the cross-sectional view of FIG. 4A, the basic configuration of the second light source unit 4B is substantially the same as that of the first light source unit 4A. The same reference numerals are given to equivalent portions, but a white light emitting diode (LED) 48 is disposed in the casing 41 as a light source. As a spectral characteristic is illustrated in FIG. 4B, the white LED 48 emits light having a bluish color, that is, a light having a short-wavelength side component. Further, the condenser lens 44 is disposed in the casing 41 and condenses the light emitted from the LED 48. The light transmitting connector 45 is disposed at the light-focusing position, and the optical coupling lens 46 is mounted inside the light transmitting connector 45. Although not illustrated, the second light source unit 4B is provided with a light intensity control unit for adjusting the light emission intensity of the LED 48 to be capable of adjusting the light emission intensity by an operation from the outside.

The illumination unit 3 of the apparatus main body 1 is configured to irradiate light toward the growth space 11, in other words, to irradiate substantially the entire surface of the growth bed unit 2 with a predetermined illuminance distribution by a predetermined light distribution. The illumination unit 3 is provided with an irradiation lens 31 having a flat plate shape whose optical axis direction is oriented in the vertical direction of the apparatus main body 1. The irradiation lens 31 includes a plurality of unit lenses 32 each having a required diameter size. The unit lenses 32 are arranged on a plane in a lattice shape and integrally formed as the irradiation lens 31 by molding of a transparent resin or the like. Here, the irradiation lens 31 is supported on the apparatus main body 1 by a lens holder 33. The unit lenses 32 are configured as convex lenses having substantially the same focal length, and the optical axes of the unit lenses are oriented in the vertical direction of the apparatus main body 1. Further, the plurality of unit lenses 32 may be configured to be independent from each other, and in this case, the irradiation lens 31 is configured as an aggregate of a plurality of lenses.

The illumination unit 3 further includes an optical fiber 35 that makes light incident on the irradiation lens 31. The optical fiber 35 is configured as an optical fiber bundle in which unit optical fibers 36 are bundled in the same number as the unit lenses 32 that constitute the irradiation lens 31. One end portion 36a of each unit optical fiber 36 is supported by the apparatus main body 1 by a holder (not illustrated) at a position above the irradiation lens 31 such that the unit optical fibers 36 have one-to-one correspondence to the unit lenses 32. The end surface of the one end portion 36a of each unit optical fiber 36 is configured as a light emitting surface and is oriented vertically downwards to be disposed on the lens optical axis of the corresponding unit lens 32.

The other end portions of the unit optical fibers 36 are bundled as an optical fiber bundle as described above to constitute the optical fiber 35, and the other end portion of each unit optical fiber 36, i.e. the other end of the optical fiber 35 is connected to a light receiving connector 34. The light receiving connector 34 may be selectively coupled to the light source unit 4, that is, each light transmitting connector 45 of the first light source unit 4A or the second light source unit 4B. The light transmitting connector 45 and the light receiving connector 34 constitute a light source selection unit in the present disclosure.

In FIGS. 1 and 2, the light receiving connector 34 is coupled to the light transmitting connector 45 of the first light source unit 4A. In this coupled state, the light condensed on the light transmitting connector 45 in the first light source unit 4A is incident on the end face of the other end portion as the light incidence surface of the optical fiber 35 via the light receiving connector 34. Then, the light is guided by each unit optical fiber 36 and then emitted from the light emitting surface of the one end portion of each unit optical fiber 36. Then, the light is incident on the corresponding unit lens 32 of the irradiation lens 31. The light incident on each unit lens 32 is irradiated toward the lower growth bed unit 2 in a condensed or diverged state.

Figure 5:
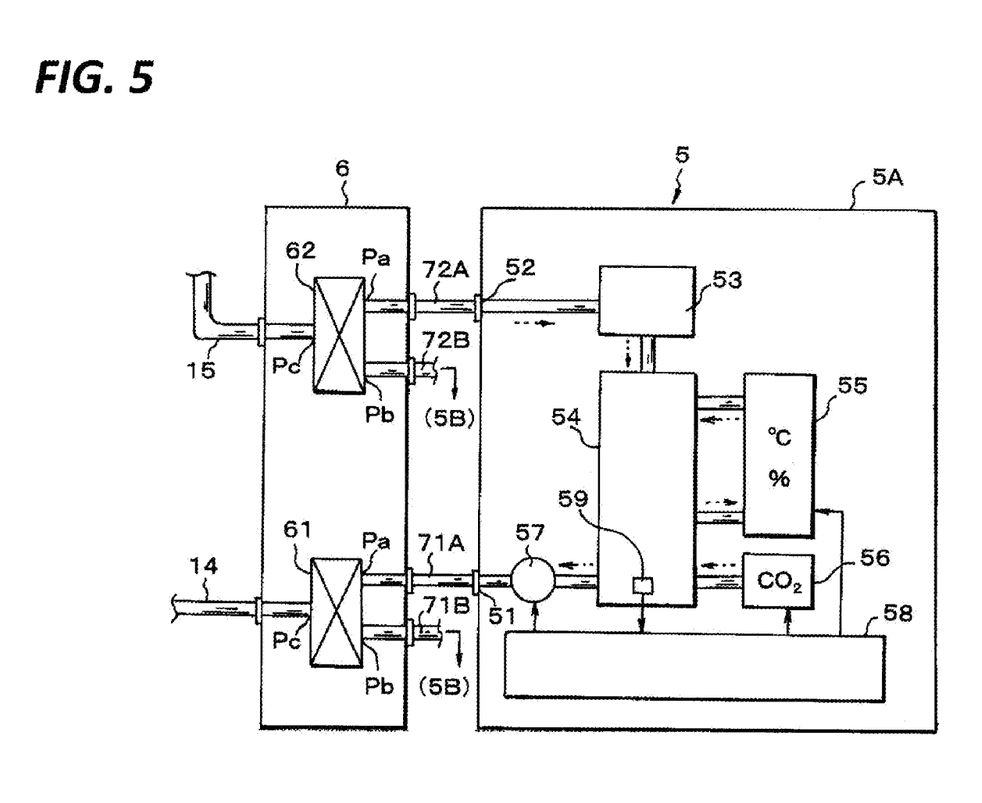
FIG. 5 is a block diagram of an air conditioning device.

FIG. 5 is a block diagram illustrating the details of the air conditioning device constituted with the air conditioner 5 and the air conditioning switching device 6 as described above. As the air conditioner 5, a plurality of air conditioners (here, two first air conditioners 5A and two second air conditioners 5B) are provided. Since the first air conditioner 5A and the second air conditioner 5B have the same configuration, the first air conditioner 5A will be described.

The first air conditioner 5A has an air supply port 51 and an air intake port 52, which are connected to the air conditioning switching device 6 via an air supply pipe 71 and an air intake pipe 72, respectively. The air intake port 52 is connected to an air regulating chamber 54 via an air purifier (air cleaner) 53. The air purifier (air cleaner) includes a filter that removes dust and the like in the air sucked into the air regulating chamber 54 from the air intake port 52. In the meantime, a blower 57 is interposed in the air supply pipe 51, and when the blower 57 is driven, the air inside the air regulating chamber 54 is sent to the air conditioning switching device through the air supply port 51.

A temperature controller 55 configured to control the temperature of the air inside the air regulating chamber is connected to the air regulating chamber 54. The temperature controller 55 is constituted by a heat exchanger and controls the air regulating chamber 54 to a desired temperature by heating or cooling the air inside the air regulating chamber 54 while circulating the air. The temperature controller 54 also functions as a humidity controller that controls humidification and dehumidification inside the air regulating chamber 54 simultaneously with the temperature control.

Further, the first air conditioner 5A includes a $CO_2$ controller 56 that controls the concentration of $CO_2$ (carbon dioxide) inside the air regulating chamber 54. The $CO_2$ controller 56 is provided with a $CO_2$ cylinder (not illustrated in the drawings), and controls the concentration of $CO_2$ in the air regulating chamber 54 by controlling the amount of $CO_2$ gas sent from the $CO_2$ cylinder to the air regulating chamber 54.

In addition, the first air conditioner 5A is provided with an integrated control unit 58 configured to control the temperature controller 55 and the $CO_2$ controller 56. The temperature, humidity, and $CO_2$ concentration of the air inside the air regulating chamber 54 may be controlled by manipulating the integrated control unit 58 artificially or based on a preset program. In controlling the temperature, humidity, and $CO_2$ concentration, a sensor 59 such as, for example, a temperature sensor, a humidity sensor, or a $CO_2$ concentration sensor, may be disposed in the air regulating chamber, and a feedback control may be performed based on a value detected by the sensor 59. Further, the air purifier (air cleaner) 53 and the blower 57 may also be controlled by the integrated control unit 58.

In the first air conditioner 5A of this configuration, when the integrated control unit 58 drives the blower 57, the air inside the air regulating chamber 54 is sent from the air supply port 51 toward the air conditioning switching device 6. At the same time, the air of the air conditioning switching device 6 is sucked into the air regulating chamber 54 from the air intake port 52. The sucked air is purified by the air conditioner (air cleaner) 53. At the same time, when the integrated control unit 58 controls the temperature controller 55, the air inside the air regulating chamber 54 is controlled to a predetermined temperature and humidity. Further, the integrated control unit 58 controls the $CO_2$ controller 56 so that the $CO_2$ concentration in the air regulating chamber 54 is controlled to a predetermined concentration.

The second air conditioner 5B has the same configuration. The air supply ports 51 of the first air conditioner 5A and the second air conditioner 5B are connected to the air conditioning switching device 6 via air supply pipes 71A and 71B, respectively. Also, the air intake ports 52 of the first air conditioner 5A and the second air conditioner 5B are connected to the air conditioning switching device 6 via air intake pipes 72A and 72B.

The air conditioning switching device 6 includes an air supply switching valve 61 and an air intake switching valve 62 which are double-acting solenoid valves. Both of these switching valves 61 and 62 are configured to connect a common port Pc to selection ports Pa and Pb in a switching manner, and selectively connect the common port Pc to the selection port Pa or Pb when a switching operation is manually performed or when a predetermined operation signal is input.

The common port Pc of the air supply switching valve 61 is connected to the air intake pipe 14 connected to the air intake port 12 of the apparatus main body. One selection port Pa is connected to the air supply pipe 71A of the first air conditioner 5A and the other selection port Pb is connected to the air supply pipe 71B of the second air conditioner 5B. Further, the common port Pc of the air intake switching valve 62 is connected to the air exhaust pipe 15 connected to the air exhaust port 13 of the apparatus main body. One selection port Pa is connected to the air intake pipe 72A of the first air conditioner 5A and the other selection port Pb is connected to the air intake pipe 72B of the second air conditioner 5B.

Therefore, the air supply switching valve 61 selectively connects the air intake port 12 of the apparatus main body 1 to any one of the air supply ports 51 of the first air conditioner 5A and the second air conditioner 5B. Further, in synchronization therewith, the air intake switching valve 62 selectively connects the air exhaust port 13 of the apparatus main body 1 to any one of the air supply ports 52 of the first air conditioner 5A and the second air conditioner 5B.

The test apparatus having the above-described configuration is set to the state of test plants P in the growth bed unit 2 of the apparatus main body 1. For example, in the case of plants to be hydroponically grown, the growth bed unit 2 is configured as a hydroponic bed to be subject to hydroponic growth of test plants P. Then, as illustrated in FIGS. 1 and 2, the apparatus main body 1 is connected to the first air conditioner 5A by the air conditioning switching device 6, and in the first air conditioner 5A, the integrated control unit 58 controls each unit. Further, the light receiving connector 34 of the optical fiber 33 leading to the illumination unit 3 is connected to, for example, the light transmitting connector 45 of the first light source unit 4A, and the first light source unit 4A is turned into a light emitting state.

In the first air conditioner 5A, the temperature controller 55 and the $CO_2$ controller are controlled by the integrated control unit 58 and the air inside the air regulating chamber 54 is controlled to a predetermined temperature, humidity, and $CO_2$ concentration. For example, the air regulating chamber 54 is controlled to have a temperature of 30° C., a humidity of 80%, and a $CO_2$ concentration of 1000 ppm. Then, when the blower 57 is driven, the air inside the air regulating chamber 54 in which the temperature, the humidity, and the $CO_2$ concentration have been controlled in this way is sent out from the air supply port 51 and sent to the air conditioning switching device 6. In the air conditioning switching device 6, since the air supply switching valve 61 is in a state of being connected to the first air conditioner 5A, the air is supplied to the growth space 11 from the air intake port 12 of the apparatus main body 1. The supplied internal air is the air obtained by circulating the air discharged from the air exhaust port 13 of the apparatus main body 1 and purifying the air by the air purifier (air cleaner) 53. As a result, the growth space 11 of the apparatus main body 1 is set in environmental conditions having a controlled temperature, temperature, and $CO_2$ concentration.

In the first light source unit 4A, light in the reddish spectrum in which a long-wavelength side component is high is emitted when the incandescent lamp 42 is made to emit light. The light is condensed on the condenser mirror 43 and is further condensed with respect to the light transmitting connector 45 in the condenser lens 44. Further, in the light receiving connector 34 connected to the light transmitting connector 45, the condensed light is incident on the light incident surface of the optical fiber 35 by an optical coupling lens 46. The light incident on the optical fiber 35 is emitted from the light emitting surface 36a after being guided in each of the plurality of unit optical fibers 36. The light emitted from each optical fiber 36 is incident on the unit lens 32 corresponding to each of the irradiation lenses 31, and is irradiated toward the lower growth bed unit 2 in a condensed or diverged state.

As a result, the test plants P in the growth bed unit 2 are illuminated with light in the reddish spectrum in which a long-wavelength side component is high with a predetermined illuminance distribution by a predetermined light distribution. At this time, the illuminance level (brightness) for the test plants P is adjusted by adjusting the light emission intensity of the incandescent lamp 42 in the first light source 4A. In this way, the growth space 11 of the apparatus main body 1 is set to the illumination conditions in the spectrum in which a long-wavelength side component is high and the growing state of the test plants P under the illumination conditions is tested and inspected.

In order to acquire growth data under different conditions in the test plants P, it is sometimes required to change and control the illumination conditions and the environmental conditions of the growth space 11 of the test apparatus. When changing the illumination condition, the light receiving connector 34 of the test apparatus is detached from the light transmitting connector 45 of the first light source unit 4A, and is connected to the light transmitting connector 45 of the second light source unit 4A at this time. Then, the second light source unit 4B is turned into the light emitting state.

By causing the LED 48 of the second light source unit 4B to emit light, light in the bluish spectrum in which a short-wavelength side component is high is emitted. The light is condensed with respect to the light transmitting connector 45 in the condenser lens 44. Further, the light is incident on the light incident surface of the optical fiber 35 connected to the light transmitting connector 45, and is emitted from the light emitting surface of each unit optical fiber 36 in the same manner as the light irradiation at the first light source unit 4A. The light is irradiated toward the lower growth bed unit 2 in a state condensed or diverged by each unit lens 32.

As a result, the test plants P in the growth bed unit 2 are illuminated with light of bluish spectrum in which a short-wavelength side component is high with a predetermined illuminance distribution by a predetermined light distribution. At this time, the illuminance level (brightness) for the test plants P is adjusted by adjusting the light emission intensity of the white LED in the second light source 4B. In this way, the growth space 11 of the apparatus main body 1 is set to the illumination conditions with a spectrum in which a short-wavelength side component is high, and the growing state of test plants P under the illumination conditions is tested and inspected.

Here, even if the spectrum of light irradiated into the growth space 11 is changed by switching between the first light source unit 4A and the second light source unit 4B, the configuration of the illumination unit 3 is not changed. Thus, a light distribution and an illuminance distribution are not changed. Therefore, it is effective when testing the influence of the spectrum on the growth of the test plants.

Since each of the first light source unit 4A and the second light source unit 4B is configured independently from the apparatus main body 1, the degree of freedom in designing each light source unit is high. Thus, the types, standards, and combination of the light sources may be freely set. The design of optical parts such as mirrors and lenses which are components may also be freely performed. Therefore, the change range in type and state of light emitted from each light source is broadened, and the change and control range of the illumination conditions at the illumination unit 3 by the light emitted from these light sources may be expanded.

In the meantime, when changing the environmental conditions in the growth space 11 of the apparatus main body 1, the switching valves 61 and 62 of the air conditioning switching device 6 are controlled to release the connection between the apparatus main body 1 and the first air conditioner 5A, and connect the apparatus main body 1 to the second air conditioner 5B. At this time, prior to this switching operation, the integrated control unit 58 of the second air conditioner 5B controls the temperature controller 55 and the $CO_2$ controller 56 of the air conditioner 5B, and controls the internal air of the air regulating chamber 54 to a predetermined temperature, humidity, and $CO_2$ concentration. For example, the air regulating chamber 54 is controlled to have a temperature of 30° C., a humidity of 30%, and a $CO_2$ concentration of 500 ppm and is turned into an idle state.

Further, when the blower 57 of the air conditioner 5B is driven simultaneously with this switching operation, the air of the air regulating chamber 54 set to a predetermined temperature, humidity, and $CO_2$ concentration is sent out to the air supply port 51, and is supplied to the growth space 11 from the air intake port 12 of the apparatus main body 1 through the air conditioning switching device 6. As a result, the growth space 11 is set in the environmental conditions having the temperature, and $CO_2$ concentration controlled by the second conditioner 5B. At this time, though it may depend on the performance of the blower 57, the environmental conditions of the growth space 11 may be changed and controlled within a short time as compared to the case of changing the environmental conditions of the growth space 11 by changing and controlling the temperature, humidity, and $CO_2$ concentration while maintaining the connection of at least the first air conditioner 5B to the apparatus main body 1. That is, the transitional time for continuously changing the environmental conditions in the growth space 11 becomes almost unnecessary and it is possible to change the environmental conditions in a very short time.

As described above, in this test apparatus, when the illumination conditions are changed, especially when the illumination conditions are changed and controlled to illumination light of different spectrum, this may be achieved by merely switching and connecting the light receiving connector 34 to the light transmitting connector 45 of a different light source unit, so that the work may be performed simply and quickly. Since the illumination unit 3 of the apparatus main body 1 and the first and second light source units 4A and 4B are separate members, the apparatus main body 1 may be configured to be compact. Further, since the apparatus main body 1 and the first and second light source units 4A and 4B are connected by the optical fiber 35, it is possible to arrange each of the first and second light source units 4A and 4B at a position spaced apart from the apparatus main body 1 by properly designing the length of the optical fiber 35, which is advantageous in securing a space for work around the apparatus main body 1.

In this exemplary embodiment, descriptions have been made with respect to an example in which the first light source unit and the second light source unit are provided as the light source unit. However, third and subsequent light source units that emit different spectrum lights may be additionally provided. In this case, when a light transmitting connector is provided for each of the third and subsequent light source units, it is possible to connect the light transmitting connector to the light receiving connector of the apparatus main body, so that the light emitted from the third and subsequent light source units can be set as the illumination light in the growth space. Further, as the light source of the third and subsequent light source units, sunlight may also be collected and used.

In addition, in this test apparatus, as described above, when changing the environmental condition, it may be sufficient if the connections of the respective first and second air conditioners 5A and 5B to the apparatus main body 1 are switched by switching the connection in the air conditioning switching device 6. Therefore, it is possible to instantaneously change and control the environmental conditions of the growth space 11 of the apparatus main body 1. At this time, it is possible to control the air inside the air regulating chamber 54 to a predetermined environmental condition by driving the air conditioner on the newly connected side in advance, so that the environmental condition of the growth space 11 can be changed and controlled within a very short time or instantaneously. Thus, it is possible to conduct a so-called thermal shock test on test plants. Further, it is possible to shorten the time for test by shortening the set time for changing the environmental conditions required for changing and controlling the environmental conditions for this type of test.

In the above-described embodiment, the illumination unit of the apparatus main body and the plurality of light source units are configured to be optically connected by optical fibers, and switch the connection by the light transmitting connectors and light receiving connectors. However, an optical path switching unit such as, for example, a movable mirror or a movable prism, may be provided on the optical path that optically connects the illumination unit and the plurality of light source units, so that the light emitted from the plurality of light source units may be selectively guided by the optical path switching unit. Further, a light transmission unit from the light source units to the illumination unit may be constituted with a light guide or a light guide tube.

Further, in the air conditioning switching device according to the exemplary embodiment, the connection between the apparatus main body and the pipe members connecting the plurality of air conditioners is switched by the switching valve. However, opening and closing valves may be individually provided in the pipes connected to the air supply port and the air intake port of each air conditioner and each of the opening and closing valves may be on-off controlled independently, so that the connection state can be switched.

The illumination unit provided in the apparatus main body of the exemplary embodiment may be configured to change and control the light distribution for the plants to be grown in the growth bed unit. For example, a filter having a required light transmittance distribution may be interposed in the illumination unit so that the light distribution and the illuminance distribution in the planar area of the bottom portion may be properly changed and controlled. Alternatively, a spectral filter may be interposed so that the color light distribution in the planar area of the growth bed unit may be properly changed and controlled.

Furthermore, by providing an illuminance sensor inside the growth space of the apparatus main body or on the growth bed unit, and performing a feedback control on the light emission intensity of the light source units connected to the apparatus main body based on the detection output of the illuminance sensor, it is possible to control the illuminance in the growth bed unit with high accuracy. Similarly, by disposing a temperature sensor, a humidity sensor, and a $CO_2$ concentration sensor inside the growth space of the apparatus main body and configuring the air conditioners connected to the apparatus main body to perform a feedback control based on the detection outputs of the sensors, the environmental conditions of the growth space may be controlled more accurately.

The present disclosure is not limited to a test apparatus for obtaining an optimal illumination condition and an environmental condition described in the exemplary embodiment, but may be applied to a plant growth apparatus that arbitrarily changes and controls the conditions in order to determine the physiological phenomena of plant growth.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A plant growth apparatus comprising:
a main body having an enclosed plant growth space configured to grow a plant therein;
an illumination device including a lens configured to irradiate the growth space with light;
an air exhaust pipe configured to remove air from the growth space;
an air intake pipe configured to provide air to the growth space;
an air conditioning device configured to control air inside the growth space,
wherein the illumination device includes a plurality of light sources provided outside the main body and the air conditioning device includes a plurality of air conditioners provided outside the main body, each of the plurality of air conditioners including an air intake port and air supply port, and one of the plurality of light sources is selected to be connected to the main body and one of the plurality of air conditioners is selectively connected to the main body by an air conditioning switch, and
wherein the air conditioning switch includes:
a first solenoid switching valve connected to the air exhaust pipe at one end and each of the air intake ports of the plurality of air conditioners and configured to selectively provide air to the air intake port of one of the plurality of air conditioners; and
a second solenoid switching valve connected to the air intake pipe at one end and each of the air supply ports of the plurality of air conditioners and configured to selectively receive air from the air supply port of the one of the plurality of air conditioners;
wherein the air conditioning switch allows for rapid transition of environmental conditions within the enclosed plant growth space by individual selection of airflow to and from the plurality of air conditioners.

2. The plant growth apparatus of claim 1, wherein each of the plurality of light sources is configured to emit light of a different wavelengths.

3. The plant growth apparatus of claim 1, further comprising an optical fiber configured to guide light emitted from one of the plurality of light sources from outside the main body to the lens provided in the main body.

4. The plant growth apparatus of claim 1, wherein each of the plurality of light sources has a casing and a light transmitting connector formed on the casing.

5. The plant growth apparatus of claim 1, wherein each of the plurality of light sources has a casing and a light transmitting connector formed on the casing,
the plant growth apparatus further comprising an optical fiber configured to guide light emitted from one of the plurality of light sources from outside the main body to the lens provided in the main body, and
wherein the optical fiber further includes a light receiving connector, with the light receiving connector being configured to be selectively connectable to one of the light transmitting connectors.

6. The plant growth apparatus of claim 1, wherein each of the plurality of air conditioners includes a temperature controller configured to control a temperature within an air regulating chamber.

7. The plant growth apparatus of claim 6, wherein each of the plurality of air conditioners further includes an integrated controller configured to control the temperature controller.

8. The plant growth apparatus of claim 7, wherein each of the integrated controllers are configured to independently control the respective temperature controllers, and wherein the air conditioning switch connects one of the plurality of air conditioners that is in an air conditioning mode to the main body via the second solenoid switching valve.

9. The plant growth apparatus of claim 1, wherein each of the plurality of light sources has a casing and a light transmitting connector formed on the casing,
the plant growth apparatus further comprising an optical fiber configured to guide light emitted from one of the plurality of light sources from outside the main body to the lens provided in the main body, and
wherein the optical fiber has one end connected to one of the light transmitting connectors and another end configured to guide light from the light source to be incident on the lens.

10. The plant growth apparatus of claim 1, further comprising:
the air intake pipe having one end connected to an air intake port of the main body and another end connected to the air conditioning switch; and
the air exhaust pipe having one end connected to an air exhaust port of the main body and another end connected to the air conditioning switch.

* * * * *